Figure 1:
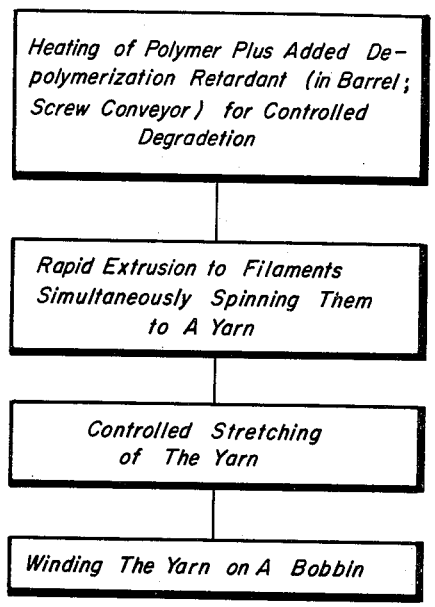

Dec. 12, 1961 D. MARAGLIANO ET AL 3,013,003
LINEAR POLYMERS OF IMPROVED MECHANICAL AND PROCESSING
PROPERTIES AND METHODS FOR THEIR PRODUCTION
Filed Dec. 6, 1956

INVENTORS
DOMENICO MARAGLIANO
ENZO DI GIULIO

BY *Toulmin & Toulmin*

ATTORNEYS

3,013,003
LINEAR POLYMERS OF IMPROVED MECHANICAL AND PROCESSING PROPERTIES AND METHODS FOR THEIR PRODUCTION
Domenico Maragliano, Terni, and Enzo Di Giulio, Ferrara, Italy, assignors to Montecatini Societa Generale per l'Industria Mineraria e Chimica, a corporation of Italy
Filed Dec. 6, 1956, Ser. No. 626,768
Claims priority, application Italy Dec. 6, 1955
1 Claim. (Cl. 260—93.7)

This invention relates to polymeric alpha-olefines particularly useful for the production of shaped articles, and to processes for producing them.

New linear, regular, head-to-tail polymers of the alpha-olefines of formula $CH_2=CHR$ in which R is a saturated aliphatic radical, an aryl radical, or a cycloaliphatic radical containing from 1 to 16 carbon atoms and methods for producing them are disclosed in the pending applications of G. Natta et al. Serial Nos. 514,097, 514,098, and 514,099, filed June 8, 1955.

As disclosed in said applications, the new polymers are obtained by polymerizing the monomers with the aid of catalysts obtained by reaction of a heavy metal compound and a metal alkyl. It is disclosed that the polymerizate generally comprises a mixture of amorphous, non-crystallizable polymers and crystallizable (isotactic) polymers, which can be separated by dissolution of the respective fractions in selected solvents, on the basis of their different steric configurations.

In the copending application of G. Natta et al. Serial No. 550,164, filed November 30, 1955, it is further disclosed that the polymerization of the monomeric alpha-olefine can be "steered" to the production of predominantly crystallizable (isotactic), linear, regular, head-to-tail polymers by selection of the catalyst used. Thus, it is disclosed that when the heavy metal compound and alkyl metal compound reacted together to produce the catalyst are such as to yield a crystalline reaction product normally insoluble in the inert hydrocarbon medium in which the reaction is carried out, and such reaction product is used as catalyst for the polymerization of the alpha-olefines, the resulting polymerizate as directly obtained is predominantly isotactic.

It is also disclosed in the said prior applications that the new polymers, in particular the isotactic polymers, possess mechanical properties by reason of which the polymers are good starting materials for the production of commercially valuable shaped articles, such as filaments, films and so on.

However, when the polymers have an intrinsic viscosity above 2.0, as measured in tetralin at 135° C., it has been found, in practice, that use of the same in the conventional processes for making the shaped articles involves various problems. This is the case, for instance, with crystallizable polypropylene.

When linear, regular head-to-tail predominantly crystallizable polypropylene having an intrinsic viscosity above 2.0 (in tetralin, 135° C.) is formed into filaments or films by the conventional melt-extrusion methods, or calendered to form films, it is necessary to operate at temperatures much higher than are normally used in such processes. When injection molding and extruding methods are used, the pressures required are also much higher than are normally used in the processing of other polymeric materials.

In addition to the mechanical problems encountered, stemming from the need for the abnormally high temperatures and pressures, we have observed, also, that exposure of these polymers to very high temperatures for prolonged periods of time, results in marked degradation of the polymer and decrease in the physical properties thereof, such as the tensile strength.

We have found that when crystallizable, linear, regular, head-to-tail polypropylene obtained by the methods of the copending applications mentioned, but having, as obtained initially, intrinsic viscosities lower than 2.0, for example an intrinsic viscosity around 1.0 are used, it is possible to obtain the shaped articles from the polymers under more nearly normal conditions of temperature or of temperature and pressure. However, the articles thus obtained do not have satisfactory mechanical properties, and have, in fact, ultimate tensile strength values which are not appreciably increased by stretching, very low elongations at break, and low capacity to be oriented by stretching.

For instance, if a crystallizable polypropylene of intrinsic viscosity about 1.0 as determined in tetralin at 135° C., and comprising the residue remaining after extraction with heptane of the crude polymerizate obtained by polymerizing propylene with the said of, as catalyst, the reaction product of titanium trichloride and diethyl aluminum monochloride, is used and specimens type D are prepared from the polymer by die-molding at 190° C.–200° C. according to ASTM test D 412/51 T, the tensile strength tests give results of the following order (at an elongation rate of 25 mm./minute at 23° C.):

Ultimate tensile strength _____ kg./mm.$^2$__ 3.75
Elongation at break _____ percent__ 400

Based upon these observations, we had concluded that shaped articles having satisfactory mechanical properties from these polymeric alpha-olefines could be obtained only if crystallizable polymers of high intrinsic viscosity (above 2.0) were used as starting material, and the processing thereof carried out under special conditions that would not induce degradation of the polymers.

Surprisingly, we have found that if the crystallizable polymers, such as crystallizable polypropylene, of very high molecular weight, i.e., those having an intrinsic viscosity above 2.0 intetralin at 135° C., are subjected to a controlled thermal depolymerization such that the intrinsic viscosity in tetralin at 135° C. is reduced to between 0.6 and 1.8, average about 0.8 to 1.5, the polymers can be formed into filaments and films having excellent mechanical properties under conditions similar to those used in producing filaments and films from other types of polymers.

The reason why the polymers resulting from the controlled thermal depolymerization behave so differently from polymers having the same average molecular weight but obtained by solvent extraction of the crude polymerizate, has not been determined. It may be that the controlled thermal depolymerization brings about a distribution of the molecular weights which is different from that of the polymers of the same average molecular weight obtained directly from the crude mixture of amorphous and crystallizable polymers. However, that is only a possible theoretical explanation and one to which we do not wish to be bound.

Based on our discovery, and in accordance with this invention, the crystallizable polymers of high molecular weight (intrinsic viscosity above 2.0) are heat-treated under controlled conditions to reduce the average molecular weight (average degree of polymerization) thereof to the extent that the intrinsic viscosity is lowered to the optimum value for processing of the polymers, and the heat-treated polymers are then formed into shaped articles.

Various factors influence the results of the heat-treatment including, primarily, the temperature employed, the duration of the heat-treatment, the presence or absence of agents which accelerate the polymer, the addition of stabilizers to the polymer, and so on. Obviously, the average molecular weight of the starting polymer also is an important factor.

All of the mentioned factors, as well as the type of apparatus in which the treatment is carried out and the type of shaped article to be formed ultimately, can be taken into consideration and correlated so as to effect a more or less rapid heat depolymerization of the polymer.

The conditions which favor rapid depolymerization of the polymer are: high temperature, presence of oxygen, absence of a heat-stabilizer or depolymerization retardant.

When oxygen is present, as when the depolymerization is effected in the presence of air, which exerts an accelerating effect, the depolymerization may be carried out rapidly at, for instance, temperatures between 150° C. and 180° C., whereas in the absence of air, higher temperatures, such as 250° C. to 350° C., may be used to facilitate the depolymerization.

Regardless of the temperature used and the absence or presence of air, the depolymerization proceeds more rapidly in the absence of a heat-stabilizer or depolymerization retardant. In such event, a heat-stabilizer or retardant is added, in an amount sufficient to prevent further breakdown of the polymer, only when a polymer having the desired intrinsic viscosity has been obtained.

When the heat-treatment is carried out in the presence of a stabilizer added in appropriate concentration to the polymer before or at the start of the heat-treatment, the depolymerization generally proceeds at a slower rate.

In general, the rate at which the depolymerization proceeds does not appear to exert any particular influence either on the properties of the heat-treated polymer or on the characteristics of the article obtained from it.

Generally speaking, heat-stabilizing agents or depolymerization inhibitors or retardants of the kind useful for stabilizing polyvinyl chloride and rubbers may be used, including particularly organo-tin compounds, alkyl-aryl phosphites, aromatic amines and phenol derivatives. Such compounds, in addition to exerting a controlling effect on the rate of the thermal conversion of the polymers, persist in the depolymerized polymers and articles formed from them, and continue to exert a stabilizing action thereon. Stabilizing agents, such as phenyl-beta-naphtylamine, which protect the polymers and shaped articles against light, can be added to the starting polymer with the heat-stabilizer or after the addition of the latter.

The polymers used as starting material in practicing this invention are normally either substantially crystallizable, linear, regular head-to-tail high molecular weight polymers having an intrinsic viscosity above 2.0, or mixtures of such polymers with the amorphous, linear, regular head-to-tail polymers. In such mixtures, the proportion of amorphous polymer is preferably not greater than 30% when the depolymerized polymer is to be used for the production of shaped articles, since otherwise difficulties in obtaining uniform shaped articles are experienced.

The heat depolymerization of the polymers can be carried out in apparatus of various types. When filaments or films are to be formed by melt-extrusion of the depolymerized polymer, batches of the starting polymer can be heated to a molten mass in a suitable vessel, such as one of barrel-shape, held at the predetermined temperature for the time required to effect the depolymerization, and then melt-extruded.

It is also possible to carry out the heating and melt-extrusion continuously using a tubular apparatus or a screw conveyor, by appropriately controlling the speed at which the mass passes through the apparatus or screw conveyor to insure that each successive portion of the polymer is depolymerized to the same extent at the temperature employed.

When it is desired to produce films of the heat-treated polymer by calendering, the depolymerization can be carried out on the calender itself by working the polymer in the heat until the predetermined depolymerization is attained and then adding to the depolymerized polymer a stabilizer which, by inhibiting further depolymerization of the polymer, permits it to be removed from the calender rolls and subjected to further processing as desired.

The extent of depolymerization which is optimum for a given polymer and the conditions for effecting it can be established "una tantum" by means of preliminary tests in which the polymer is subjected to varying conditions resulting in variations in the intrinsic viscosity. After such empirical determinations, the optimum conditions for the polymer are fixed and can then be used for heat-treatment of the polymer on a large scale.

When the polymer is calendered, the behaviour of the calendered mass itself, particularly the ease with which the sheet begins, at a certain moment, to come off the rolls, is an indication that the optimum depolymerization of the given polymer has been attained. At that point, the stabilizer is added, by nebulizing it if it is a liquid, or by spreading it or smearing it on the polymer if it is a solid or an oily material. After further calendering the mass for a short time to incorporate the stabilizer therein, and in order to obtain a homogeneous mass, the sheet can be passed to further processing stages.

The shaped articles formed from the heat-depolymerized polymers, as by extrusion or calendering methods, are stretched for enhancement of the mechanical properties thereof. The stretching is preferably performed at temperatures between 80° C. and 150° C., with ratios of 1:5 to 1:15. Films of the thermally depolymerized polymers are stretched, either simultaneously or successively, in both directions. The stretched filaments and films may be subjected to additional finishing or stabilizing treatments.

The following examples are given to illustrate specific embodiments of the invention, it being understood that these examples are not intended as limitative.

*Example 1*

A linear, regular head-to-tail crystallizable polypropylene having an intrinsic viscosity, in tetralin at 135° C., of 4.3 and containing about 10% of amorphous linear, regular head-to-tail polypropylene is held for three hours under nitrogen in a barrel-shaped vessel heated at 250° C. After this treatment, the polymer has an intrinsic viscosity of 1.8. The molten mass of degraded polymer is extruded rapidly into the air (30 seconds through a spinneret having 30 holes of 180μ diameter at 250° C.–280° C.) and the filaments thus formed are collected into a single thread. The yarn thus obtained is stretched in the air at 120° C. with a ratio of 1:8. The stretched yarn has a tenacity of 6 gms. denier and an elongation at break of 20%. The intrinsic viscosity of the polymer in the yarn is 1.1.

*Example 2*

Polypropylene as in Example 1 is treated as described in that example, except that 0.5% of dibutyl tin-dibutyl mercaptide (heat-stabilizer) and 2% of diphenylamine (light-stabilizer) are added to the heated mass in the vessel just prior to extruding the same. By spinning the mass as in Example 1, a yarn of similar properties is obtained, the polymer having an intrinsic viscosity of 1.3. This yarn has excellent heat and light stability.

*Example 3*

Polypropylene as in Examples 1 and 2 is processed for two minutes at 170 C. on a calender. After the treatment, it has an intrinsic viscosity of 1.7. As is apparent, the depolymerization proceeded more rapidly than in Examples 1 and 2, due to the accelerating action of the air. About 3% of a mixture of dibutyl tin-dibutyl mercaptide and diphenyl-ethyl phosphite is added, and the mass is melted and extruded rapidly through a spinneret as in Example 1. The yarn obtained, after stretching thereof in air at a ratio of 1:8, has a tenacity of 7 gms. denier and an elongation at break of 15%. The intrinsic viscosity of the polymer in the yarn is 1.0.

Example 4

A crystallizable (isotactic) polypropylene of intrinsic viscosity 2.73 and having added thereto 0.5% of dibutyl tin-dibutyl mercaptide is fed into a screw conveyor heated at a temperature of 250° C. and is recirculated through the screw conveyor so that the time to which the polymer is subjected to the elevated temperature is one hour. The polymer is then drawn from the conveyor by means of a gear pump and extruded into the air through a spinneret having 30 holes of 180μ diameter at a rate of 10–20 meters per minute. The filaments formed are collected into a single yarn and wound up on a bobbin by a parallel winding machine. The yarn thus obtained has a tenacity of 0.75 g./denier, an elongation at break of 525% and a Young's modulus of 27 kg./mm.² The yarn is stretched at 100° C. in water, with a ratio of 1:5, and after such stretching has a tenacity of 5.5 g./denier, an elongation at break of 24%, a Young's modulus of 270 kg./mm.², and a $\Delta_n$ value (difference of refractive index according to the two axes of the fiber) of 27.10⁻³. The intrinsic viscosity of the polymer in the stretched yarn is 1.27.

Example 5

Example 4 is repeated, except that the amount of stabilizer used is increased to 1.0% by weight, based on the polymer weight, and the temperature of the screw conveyor is increased to 300° C. The stretched yarn finally obtained had a tenacity of 6 gms./denier and an elongation at break of 18%. The intrinsic viscosity of the yarn in the polymer is 1.4.

Example 6

Polypropylene having an intrinsic viscosity of 3.5 and containing 0.5% of diphenyl ethyl phosphite, was heated for 60 minutes at 300° C. under nitrogen. The depolymerized polymer was then extruded, cooled and cut into tiny flakes. The intrinsic viscosity was determined on the polymer flakes and found to be 1.6. The flakes were melted rapidly by passing them through a melting plate at 250° C. under nitrogen. The molten mass obtained was forced into the air by a gear pump, through a spinneret having 18 holes of 200μ diameter, at a rate of 200–400 m./min. The filaments were collected into a single yarn and wound up on a bobbin by a parallel winding machine and at a rate of 200–400 m./min. which resulted in a direct stretching of the yarn at 1:20.

The yarn thus obtained had a tenacity of 0.78 g./denier, an elongation at break of 550% and a Young's modulus of 30 kg./mm.² That yarn was then stretched at 120° C. with a ratio of 1:6, after which it had a tenacity of 5.8 gms./denier, an elongation at break of 19%, a Young's modulus of 330 kg./mm.², and $\Delta_n$ value (difference of refractive index according to the two axes of the fiber) of 32.10⁻³. The polymer in this final yarn had an intrinsic viscosity of 1.4.

Example 7

Polypropylene having an intrinsic viscosity of 5.06 and containing 14.4% of amorphous polypropylene was calendered at 172° C. for about 2 minutes. There was then added to the sheet (which had become homogeneous and transparent) 3% by weight of finely divided diphenylethyl phosphite. The mass was calendered for about one minute more to homogenize the polymer and stabilizer. A transparent, uniform sheet, partially oriented by the action of the calender rolls, was removed from the rolls.

The sheet was then stretched in a bath of ethylene glycol at 130° C. in two successive stages: first stage, longitudinal stretching with a ratio of 1:8; second step, transverse stretching with a ratio of 1:10.

The film was heat-treated at 150° C. for 3 seconds, while restrained from shrinking. The final film had an ultimate tensile strength of 20 kg./mm.², an elongation at break of 40%, and shrinkage at 100° C. of 0.1%. The intrinsic viscosity of the polymer in the final film was 1.56.

Example 8

A crystallizable polypropylene having an intrinsic viscosity of 6.1, and containing 5% amorphous polymers was calendered at a temperature of 180° C. for 5 minutes; 2.5% of finely divided dibutyl tin-dibutyl mercaptide was added and, after an additional period of calendering of about 1 minute to homogenize the polymer with the stabilizer, a translucent and uniform sheet was removed from the rolls. The sheet was then stretched in hot air at 140° C. in two stages; first stage, longitudinal stretching with a ratio of 1:10; second stage, transverse stretching with a ratio of 1:13. The film thus obtained was heat treated under non-shrinking conditions at a temperature of 150° C. for 3 seconds.

The physical properties of the finished film were as follows: intrinsic viscosity 1.3; ultimate tensile strength 18 kg./mm.²; elongation at break 43%, shrinkage at 100° C., 0.09%.

Example 9

The linear, regular head-to-tail crystallizable polypropylene used had an intrinsic viscosity of 2.6, and contained 30% of amorphous polymers. It was calendered at a temperature of 160° C. for 3 minutes: 2% of a finely divided 1:1 dibutyl tin-dibutyl mercaptide diphenylamine mixture was added and, after an additional period of calendering of about 2 minutes to homogenize the polymer with the stabilizers, a translucent and uniform sheet was removed from the rolls. The sheet was stretched in hot air at 120° C. in two stages: first stage, longitudinal stretching with a ratio of 1:6; second stage, transverse stretching with a ratio of 1:7. After stretching, the film was heat treated under non-shrinking conditions at a temperature of 125° C. for 4 seconds. The final film had the following properties: intrinsic viscosity 0.8; ultimate tensile strength 11 kg./mm.²; elongation at break, 70%.

Example 10

A crystallizable polypropylene of intrinsic viscosity of 4.8, containing about 19.6% of the amorphous polymers, is introduced into a screw conveyor, the feeder of which is maintained under nitrogen at a temperature of 310° C. The polymer passes through the screw conveyor in 25 minutes. The molten mass is extruded through the straight slit of an extruder head kept at a temperature of 200° C. in the form of a translucent and homogeneous film 40 cm. wide and 2/10 mm. thick. The film thus extruded, after passing for a length of 25 cm. in the air, is further quenched in water and wound on a roll, from which it passes to the stage of transverse stretching in hot air at a temperature of 130° C. with a stretching ratio of 1:8 and then to the stage of longitudinal stretching, which is carried out at the same temperature and with the same stretching ratio. The stretched film is heat-treated under non-shrinking conditions at a temperature of 145° C. for 4 seconds. Finally, the film is submitted to the main physical tests and found to have the following properties: intrinsic viscosity 1.2; ultimate tensile strength 15 kg./mm.²; elongation at break 35%; shrinkage at 100° C., 0.5%.

Example 11

A crystallizable polypropylene having an intrinsic viscosity of 3.3 and containing 22% of low molecular weight polymers is introduced into a screw conveyor heated to 270° C. The polymer remains in the screw conveyor for 4 minutes and after this time is extruded through the circular slit of an extruder head kept at a temperature of 230° C., in the form of a tubular film which is stretched by blowing. The film is then wound on a roll and submitted to the heat treatment described in the foregoing example. The final properties of the film are as follows: intrinsic viscosity 1.8; ultimate tensile strength 10 kg./mm.$^2$; elongation at break 30%; shrinkage at 100° C., 0.2%.

Example 12

A crystallizable polypropylene having an intrinsic viscosity of 6.2 and containing 1% diphenylethyl phosphite is introduced into a screw conveyor kept under nitrogen and heated at a temperature of 300° C. The polymer remains in the screw conveyor for 60 minutes, then is extruded through an extruder head kept at a temperature of 250° C., in the form of a film tape that is wound on rolls. From these rolls it passes to the stretching operation which is carried out in ethylene glycol at 130° C.

The transverse stretching is carried out with a stretching ratio of 1:7, the longitudinal stretching with a stretching ratio of 1:8. A heat treatment follows, which is carried out under non-shrinking conditions at 140° C. for 5 seconds. The film thus obtained shows the following properties: intrinsic viscosity 0.9; ultimate tensile strength 15 kg./mm.$^2$; elongation at break 40%.

As previously mentioned, the crystallizable polymers used as starting material in the foregoing examples may be produced by polymerizing the alpha-olefine with the aid of a catalyst obtained by reacting a heavy metal compound with a metal alkyl in an inert, hydrocarbon solvent.

The heavy metal compound consists of a compound or a mixture of compounds of a heavy metal selected from the sub-group of groups IV to VI of the Periodic Table, i.e., it may be a halide of a transition metal such as titanium, zirconium, hafnium, thorium, vanadium, tantalum, niobium, chromium, molybdenum, tungsten and uranium.

The metal alkyl compound comprises a substance or a mixture of substances selected from the group consisting of simple and complex compounds the molecules of which contain an element from the group forming the 2nd and 3rd columns of the Periodic Table, i.e., beryllium, magnesium, zinc, cadmium and other elements of the 2nd group, as well as aluminum and other elements of the 3rd group.

The valences of the element from the 2nd or 3rd column of the Periodic Table are linked to the same or different alkyl radicals such as ethyl, propyl, butyl, etc. One valence of such element may be satisfied by halogen or by an alkoxy radical.

Inert solvents suitable for use in preparing the catalyst are paraffinic hydrocarbons such as a light gasoline substantially free of olefinic bonds, n-heptane, and iso-octane. Anhydrous benzene may be used.

The liquid in which the heavy metal and metal alkyl compounds are reacted may also be the alpha-olefine to be polymerized. The molar ratio of the heavy metal compound to metal alkyl may be 1:1 to 1:10, usually preferably 1:1 to 1:6.

Polymerization of the alpha-olefine with the aid of the catalysts described may be carried out at temperatures between 50° C. and 100° C., at normal atmospheric pressure or at somewhat increased pressure, e.g., at a pressure between normal atmospheric and 30 atmospheres.

The polymerization reaction mass comprises, as impurities, residual catalyst and inorganic compounds resulting from decomposition of the catalyst. The product is therefore treated with a suitable agent, such as methanol, for decomposing the residual catalyst.

The mass may be purified by the addition of methanol and treatment with HCl.

The initial polymerization product is a mixture of polymers, comprising, usually, a small amount of an oily, low molecular weight fraction, an amorphous fraction of higher molecular weight, and a high molecular weight, crystallizable fraction. The oily low molecular weight polymers can be separated out by extraction with acetone.

When the amount of amorphous polymer remaining after the acetone extraction is not over 30% by weight, the mixture of amphorus and crystallizable polymers may be used without further fractionation as starting material for the present process. However, if the amount of the amorphous polymers is greater than 30%, such polymers, of a proportion thereof, are preferably removed from the polymerizate, before it is used in the present process, by extracting the mass with a suitable solvent, e.g., ether, in the case of polypropylene, to leave a residue substantially consisting of crystallizable polypropylene or comprising a mixture of the crystallizable high molecular weight polypropylene (intrinsic viscosity above 2.0) and not more than about 30% by weight of the amorphous polypropylene.

When the catalyst is crystalline, such as is obtained by reacting titanium trichloride and aluminum triethyl in the inert solvent, the initial polymerizate may consist substantially of the crystallizable (isotactic) polypropylene.

The following is an example of one method for the production of a polypropylene suitable for use in the process of this invention. (Parts by weight unless otherwise stated.)

1.8 parts of TiCl$_4$ dissolved in 50 parts by volume of anhydrous gasoline (B.P. 98° C.) are added, at a temperature slightly below room temperature (5° C.–10° C.), to a solution of 11.4 parts of triethyl aluminum in 150 parts by volume of gasoline. The solution is further diluted to 500 parts by volume and introduced into an oscillating stainless steel autoclave of suitable capacity, and which is previously thoroughly dried and evacuated. 270 parts of liquid carefully dried propylene are then charged in a single batch into the autoclave. The temperature is maintained between 60° and 70° and the autoclave is kept in motion until the pressure has decreased from an initial 15 to about 11 atmospheres. The gases are vented from the autoclave.

The polymerization product is suspended in di-isopropylether and the suspension is heated with strong stirring and while bubbling through gaseous HCl. After four hours a little methanol is added to the suspension in order to precipitate any polymer dissolved, and the polymer is filtered off under suction, and dried at 100° C. under reduced pressure. The polymer (83 parts) is extracted successively with acetone, ether, and boiling heptane.

The residue of the heptane extraction (31.2% parts) of a highly crystalline solid having a first transition temperature of about 160° C. and an intrinsic viscosity of 3.0 in tetralin at 135° C. Such polypropylene may be heat-treated as described herein and formed into shaped articles under conventional conditions.

Figure 2:
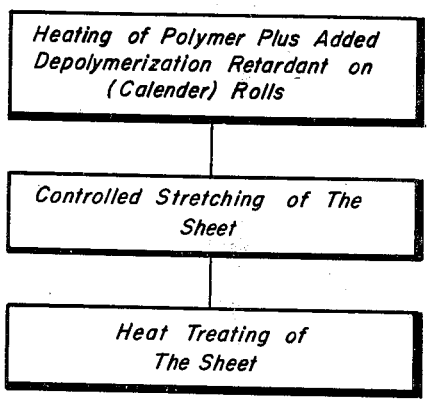

The method of the invention is illustrated in the accompanying flowsheet, in which FIG. 1 illustrates the sequence of steps comprising heating a mixture of the polypropylene and depolymerization retardant to effect the controlled degradation, rapidly extruding the mass to filaments and spinning the filaments into a yarn, subjecting the yarn to controlled stretching, and winding the stretched yarn on a take-up device; and FIG. 2 illustrates the process of obtaining a sheet of the polypropylene having controlled molecular weight comprising heating a mixture of the polypropylene and a depolymerization retardant on calendar rolls, subjecting the sheet to controlled stretching, and heat-treating the stretched sheet.

Various modifications may be made in carrying out the instant invention without departing from the spirit and scope thereof. Thus, other alpha-olefins of the type defined herein, and more particularly those of formula CH$_2$=CHR in which R is an alkyl, aryl or cycloalkyl radical containing from 2 to 16 carbon atoms may be substituted for the propylene specifically exemplified.

It is to be understood, therefore, that we claim as part of our invention any variations, substitutions, and changes that lie within the scope of the invention and the appended claim, and intend to include within the scope of said claim such changes as may be apparent to those skilled in the art in the practice of the principles of this invention, and within the scope thereof as set forth in the foregoing specification.

What is claimed is—

A process for obtaining a more readily processable, substantially linear, head-to-tail, crystallizable polypropylene containing not more than 30% amorphous, non-crystallizable polymers, and having an intrinsic viscosity between 0.8 and 1.8 as determined in tetralin at 135° C., from such a polypropylene having an intrinsic viscosity above 2.0 determined in tetralin at 135° C., which process comprises heating the starting polypropylene of intrinsic viscosity above 2.0 at a selected temperature in the range between about 150° C. and about 180° C. in the presence of oxygen until the average degree of polymerization thereof is reduced to a value corresponding to an intrinsic viscosity between 0.8 and 1.8 as determined in tetralin at 135° C.

References Cited in the file of this patent

UNITED STATES PATENTS

| | | |
|---|---|---|
| 2,367,173 | Martin | Jan. 9, 1945 |
| 2,372,001 | Joyce | Mar. 20, 1945 |
| 2,835,659 | Guillet | May 20, 1958 |
| 2,842,532 | Campbell | July 8, 1958 |

FOREIGN PATENTS

| | | |
|---|---|---|
| 569,043 | Great Britain | May 2, 1945 |
| 581,279 | Great Britain | Oct. 7, 1946 |
| 526,101 | Italy | May 14, 1955 |

OTHER REFERENCES

Natta: La Chimica e L'Industria, volume 37, pages 888–903, October 1955. Page 890 only needed.